US008424013B1

(12) United States Patent
Chalmer et al.

(10) Patent No.: US 8,424,013 B1
(45) Date of Patent: Apr. 16, 2013

(54) METHODS AND SYSTEMS FOR HANDLING INTERRUPTS ACROSS SOFTWARE INSTANCES AND CONTEXT SWITCHING BETWEEN INSTANCES HAVING INTERRUPT SERVICE ROUTINE REGISTERED TO HANDLE THE INTERRUPT

(75) Inventors: Steven R. Chalmer, Auburndale, MA (US); Steven T. McClure, Northboro, MA (US); David L. Reese, Westborough, MA (US)

(73) Assignee: EMC Corporation, Hopkinton, MA (US)

( * ) Notice: Subject to any disclaimer, the term of this patent is extended or adjusted under 35 U.S.C. 154(b) by 1368 days.

(21) Appl. No.: 11/540,458

(22) Filed: Sep. 29, 2006

(51) Int. Cl.
*G06F 9/46* (2006.01)
*G06F 7/38* (2006.01)

(52) U.S. Cl.
USPC .......................... 718/108; 718/100; 712/244

(58) Field of Classification Search .................. None
See application file for complete search history.

(56) References Cited

U.S. PATENT DOCUMENTS

| | | | | |
|---|---|---|---|---|
| 5,515,538 | A * | 5/1996 | Kleiman | 710/260 |
| 6,061,711 | A * | 5/2000 | Song et al. | 718/108 |
| 6,381,682 | B2 * | 4/2002 | Noel et al. | 711/153 |
| 6,785,887 | B2 * | 8/2004 | Armstrong et al. | 718/100 |
| 7,320,044 | B1 * | 1/2008 | Zandonadi et al. | 710/261 |
| 7,478,394 | B1 * | 1/2009 | de Dinechin et al. | 718/108 |
| 7,665,088 | B1 * | 2/2010 | Bugnion et al. | 718/1 |
| 7,945,908 | B1 * | 5/2011 | Waldspurger et al. | 718/1 |
| 2004/0055003 | A1 * | 3/2004 | Sundaram et al. | 718/108 |
| 2004/0088710 | A1 * | 5/2004 | Ronkka et al. | 718/107 |
| 2004/0177193 | A1 * | 9/2004 | Ohno et al. | 710/260 |
| 2004/0205755 | A1 * | 10/2004 | Lescouet et al. | 718/100 |
| 2004/0237086 | A1 * | 11/2004 | Sekiguchi et al. | 718/100 |
| 2005/0102458 | A1 * | 5/2005 | Ober et al. | 710/260 |
| 2005/0114616 | A1 * | 5/2005 | Tune et al. | 711/163 |
| 2006/0020852 | A1 * | 1/2006 | Bernick et al. | 714/11 |
| 2006/0112394 | A1 * | 5/2006 | Asai et al. | 718/108 |
| 2006/0161421 | A1 * | 7/2006 | Kissell | 703/26 |
| 2006/0161921 | A1 * | 7/2006 | Kissell | 718/102 |
| 2006/0190945 | A1 * | 8/2006 | Kissell | 718/108 |
| 2007/0074224 | A1 * | 3/2007 | Chen | 718/108 |
| 2008/0034193 | A1 * | 2/2008 | Day et al. | 712/244 |

* cited by examiner

*Primary Examiner* — Meng An
*Assistant Examiner* — Tammy Lee
(74) *Attorney, Agent, or Firm* — Muirhead and Saturnelli, LLC

(57) ABSTRACT

Methods and systems are disclosed that relate to handling interrupts across multiple software instances. An exemplary method includes receiving an interrupt at a current CPU. An instance includes a set of independent threads of execution each with its own code context, interrupt service routines, drivers, and operating system services. The method further includes storing context information relating to the first instance, identifying the second instance associated with the interrupt, running at least one interrupt service routine, and restoring the context information relating to the first instance.

10 Claims, 7 Drawing Sheets

METHODS AND SYSTEMS FOR HANDLING INTERRUPTS ACROSS SOFTWARE INSTANCES AND CONTEXT SWITCHING BETWEEN INSTANCES HAVING INTERRUPT SERVICE ROUTINE REGISTERED TO HANDLE THE INTERRUPT

BACKGROUND

A central processing unit (CPU), or sometimes simply processor, is the component in a digital computer that interprets instructions and processes data contained in computer programs. The fundamental operation of most CPUs, regardless of the physical form they take, is to execute a sequence of stored instructions called a program. An operating system (OS) is a software program that manages the hardware and software resources of a computer. The OS performs basic tasks, such as controlling and allocating memory, prioritizing the execution of programs, controlling input and output devices, providing network access, and managing files.

A software instance is an application program running on an embedded computer system. Typically a software instance will include the application code and the operating system code built together as a single executable image sharing all the computer memory and hardware resources.

In a multi-tasking program, there are independent sequences of code (threads) which execute asynchronously with respect to each other. In such programs, an operating system service, called a thread scheduler, provides the mechanism for selecting which of the threads to run. Multi-tasking programs are further divided into two groups: pre-emptive systems in which control of the scheduling mechanism is based on asynchronous external events, such as a timer interrupt; and cooperative systems in which control of the scheduling mechanism is determined by the threads in the program itself.

To execute more than one software instance on a computer system, the following three problems have to be solved:
1. Each software instance must have an isolated address space from the other instances. This is accomplished using the MMU to provide a logical address space for each instance. A MMU defines a mapping between logical addresses and physical addresses. In one typical design, the logical address space is divided into fixed size units called "pages" and the mapping is defined by a set of "page tables".
2. Each software instance must be able to access all of the hardware resources, such as I/O devices, that it requires for its operation, including any interrupts that are defined by the underlying hardware. The invention does not resolve the problem of simultaneous access to the same hardware by different instances.
3. There must be a mechanism for selecting which software instance to run and switching the execution environment between different instances on the computer system. This mechanism is performed by an "instance scheduler". Swapping instances requires saving the state of the execution environment, called a code context and restoring the code context of the next software instance to run.

Previous methods of running more than one instance on a computer system included virtualization. Virtualization works by providing a hardware abstraction layer, which can be either complete or partial. The XEN™ virtual machine, available from XenSource Inc., enables the execution of multiple guest operating systems on the same computer hardware. This form of virtualization is achieved using a technique called paravirtualization. In paravirtualization, a software interface is presented to a virtual machine that is similar but not identical to that of the underlying hardware. Presenting the software instance to the virtual machine requires the OS to be explicitly ported to run on top of the virtual machine, but may enable the virtual machine itself to be simpler and the virtual machines that run on it to achieve higher performance.

Emulation is another method of running more than one instance on a computer system. A software emulator allows computer programs to run on a platform other than the one for which they were originally compiled and linked. The BOCHS emulator, available from <http://bochs.sourceforge.net/> and sponsored by Mandrakesoft, a French company now known as Mandriva, can emulate the hardware needed by the guest operating system, including hard drives, CD drives, and floppy drives. Disk and ISO images can be "inserted" while the system is being run. However, the system performance is very slow due to the fact that the emulation must completely simulate the CPU instruction set. Additionally, emulation doesn't provide any hardware virtualization features.

Interrupts handling is more complicated on a system including more than one CPU. This is necessary because each of the CPUs can access the same set of hardware resources. Theoretically, anytime a resource generates an interrupt, the resource has to direct the interrupt to the proper CPU. One way to ensure that the interrupt gets to the proper CPU is to split up the hardware on a system so that any given instance running on the associated CPU is limited to the associated resources and associated interrupts. Thus, an interrupt only affects the single associated CPU. Problems remain, however, if the CPU runs more than one instance.

Currently, when an interrupt is generated and there is only one instance running on a CPU, interrupt dispatch code handles the interrupt directly. An instance registers its associated interrupt service routine (ISR) for each interrupt it receives. Each ISR has an associated interrupt and code context. When a CPU receives an interrupt, it saves the current context, runs the ISR in it's own context, and then restores the saved context. When multiple instances exist, each instance can register its own interrupt service routine for an interrupt. The instance running on the CPU when the interrupt is received may not be one of the instances that registered an ISR for the particular interrupt. In this case, instance swapping may be necessary so the appropriate ISR's can be invoked.

SUMMARY

Methods and systems are disclosed for handling interrupts across multiple software instances on an embedded computer system. Interrupts include both signals from hardware devices in the system and interrupts from CPUs in a multi-processor system. One embodiment of the invention is a method of mapping an interrupt to one or more instances. The method includes running a first instance and receiving an interrupt associated with a second instance at a CPU. The method further includes storing context information relating to the first instance and identifying the second instance. The method also includes running at least one interrupt service routine associated with the second instance, and restoring the context information relating to the first instance.

Another embodiment of the invention is a system for handling interrupts. Interrupts include both signals from hardware devices in the system and interrupts from CPUs in a multiprocessor system. The system may comprise a central processing unit and a memory. The central processing unit and memory are configured to perform a method comprising running a first instance. The method includes receiving an interrupt at a current CPU, wherein the interrupt is associated with a second instance comprising a set of independent threads of execution each with its own code context, interrupt service routines, drivers, and operating system services. The method further includes storing context information relating to the first instance, identifying the second instance associated with the interrupt, running at least one interrupt service routine, and restoring the context information relating to the first instance.

Additional embodiments consistent with principles of the invention are set forth in the detailed description that follows or may be learned by practice of methods or use of systems or articles of manufacture disclosed herein. It is understood that both the foregoing general description and the following detailed description are exemplary and explanatory only, and are not restrictive of the invention as claimed.

BRIEF DESCRIPTION OF THE DRAWINGS

The accompanying drawings, which are incorporated in and constitute a part of this specification, illustrate several embodiments of the invention and, together with the description, serve to explain the principles of the invention. In the drawings.

DETAILED DESCRIPTION

With respect to the present invention, the inventors recognized the need to be able to run more than one software instance on a system with more than one CPU or on a CPU complex sharing the same memory domain. The inventors recognized this need exists even for programs that were written to be executed with dedicated memory resources. As will be described further below, the present invention can enable multiple software instances to run on a system including more than one CPU, simultaneously in parallel without interfering with each other. Additionally, the present invention can enable multiple instances to run on a single CPU by timesharing on the single CPU. The present invention enables instances on separate CPUs to be swapped at independent times without having to be synchronized. The inventors further recognized a need to map an interrupt to one or more software instances, for example, when one or more of the foregoing features are enabled.

Reference is now made in detail to illustrative embodiments of the invention, examples of which are shown in the accompanying drawings.

Figure 1:
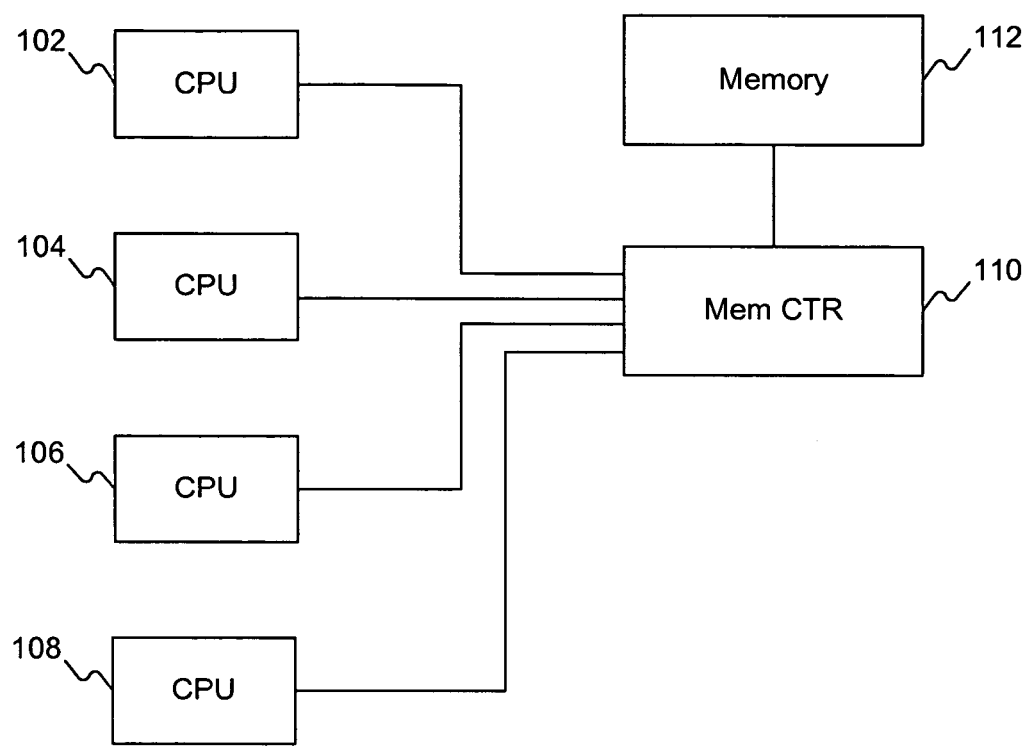
FIG. 1 illustrates a multiprocessor environment, consistent with features and principles of the present invention.

FIG. 1 illustrates an exemplary multiprocessor environment, consistent with features and principles of the present invention. Referring to FIG. 1, a schematic diagram 100 shows CPUs (processors) 102, 104, 106, and 108 coupled to a memory control 110, which is coupled to memory 112. The CPUs 102, 104, 106, and 108 can be any one of a number of commercially-available CPU devices (with corresponding support and interface circuitry), such as the PowerPC CPU provided by IBM, Inc. The present invention can enable instances, which may not be written to ensure that their threads are protected from other instances' threads, to run on a single CPU, and/or multiple CPUs all sharing the same memory.

Memory 112 can be any of a number of commercially-available types of digital computer memory, such as RAM, Flash memory, disk memory, and/or other types of memory devices, that may be accessed by the CPUs 102, 104, 106, and 108. The CPUs 102, 104, 106, and 108 may also include connections to and from external devices (not shown) controlled by the CPUs 102, 104, 106 and 108. The devices coupled to the CPUs 102, 104, 106, and 108 may include I/O devices, communication devices, and/or any other devices that are controllable by the CPUs 102, 104, 106, and 108. In one embodiment, the CPUs are part of a Storage Area Network (SAN) adapter board used in connection with a SYMMETRIX™ Data Storage device provided by EMC Corporation of Hopkinton, Mass. However, it will be appreciated by one of ordinary skill in the art that the system described herein may be adapted for use in any application where a CPU is programmed with multitasking (multiprocess) software to perform CPU-related functions.

Figure 2:
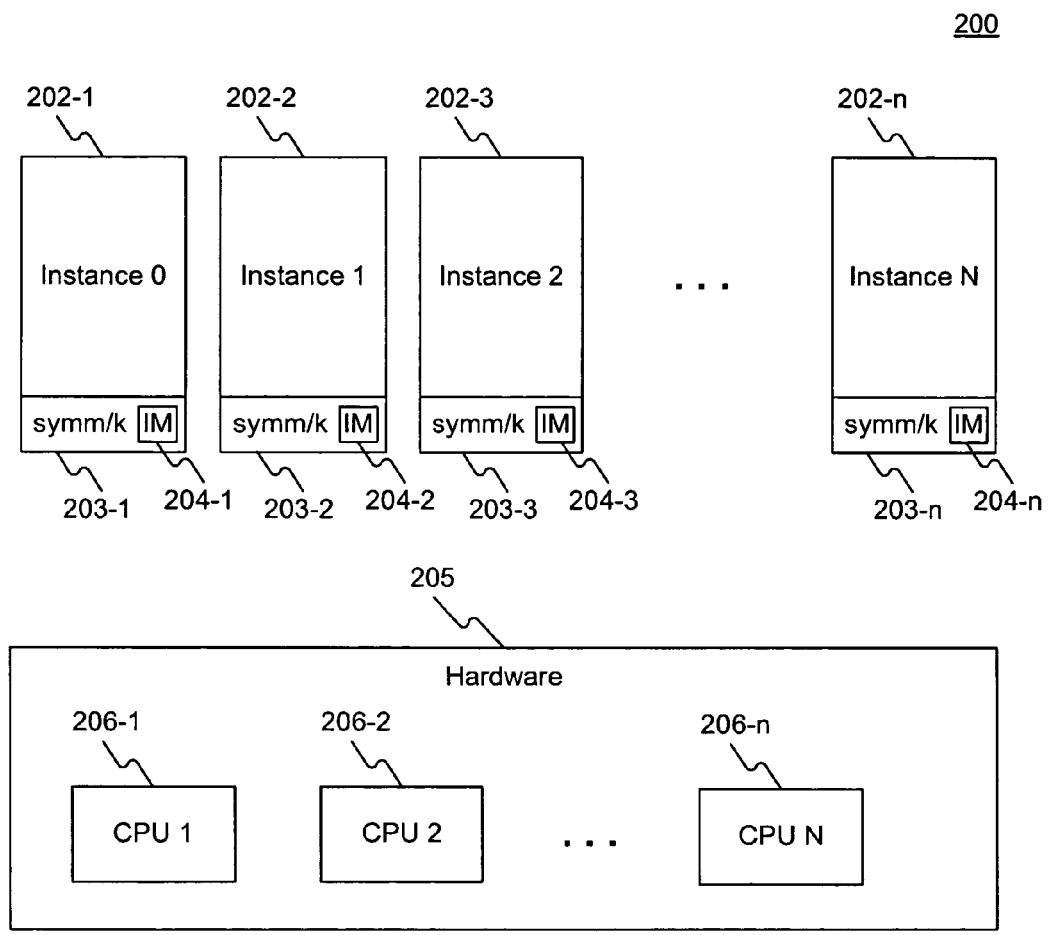
FIG. 2 illustrates another multiprocessor environment, consistent with features and principles of the present invention.

FIG. 2 illustrates another exemplary multiprocessor environment, consistent with features and principles of the present invention. System 200 includes one or more software instances 202-1, . . . , 202-n. As used herein, the term "instance" refers to an independently compiled set of schedule code contexts, interrupt service routines, drivers and OS services. Each instance 202-1, . . . , 202-n includes an OS 203-1, . . . , 203-n, such as the Symm/K OS available from EMC Corp., as well as an instance manager 204-1, . . . , 204-n. Each instance 202-1, . . . , 202-n may be written to be executed on a single CPU or CPU complex.

Each instance 202-1, . . . , 202-n may include a thread scheduler for its own threads. Thread schedulers' functions can be executed preemptively or cooperatively, as described further below. A thread scheduler may run concurrently or simultaneously with the thread schedulers of other instances if there are multiple CPUs.

Hardware 205 may include a CPU complex including one or more CPUs 206-1, . . . , 206-n. In another embodiment, one single CPU can contain more than one instance running on the CPU.

Each instance manager 204-1, . . . , 204-n chooses an instance 202-1, . . . , 202-n to run on the CPU complex once another instance 202-1, . . . , 202-n that is running has been preempted, cooperatively yielded the CPU or has terminated. Instance managers 204-1, . . . , 204-n are described in greater detail below.

Any instance or set of instances may also register interrupt service routines (ISRs) for the some hardware interrupt. ISRs must run in the processor state of the instance 202-1, . . . , 202-n that installed them. ISRs must also run on the CPU that received the interrupt. When an interrupt is received that on a CPU for which there is no registered ISR in the currently running instance, a normal context save happens, instance manager code in Symm/K determines which instance(s) this interrupt goes to, performs an "instance swap", and runs the ISR within those instance(s), and restores the saved context back to interrupted instance. If an interrupt is received on a CPU for which there is a registered ISR in the currently running instance, then a normal context save happens, runs the ISR within the current instance, and restores the saved context back to the interrupted instance. This process is explained in greater detail below.

Figure 3A:
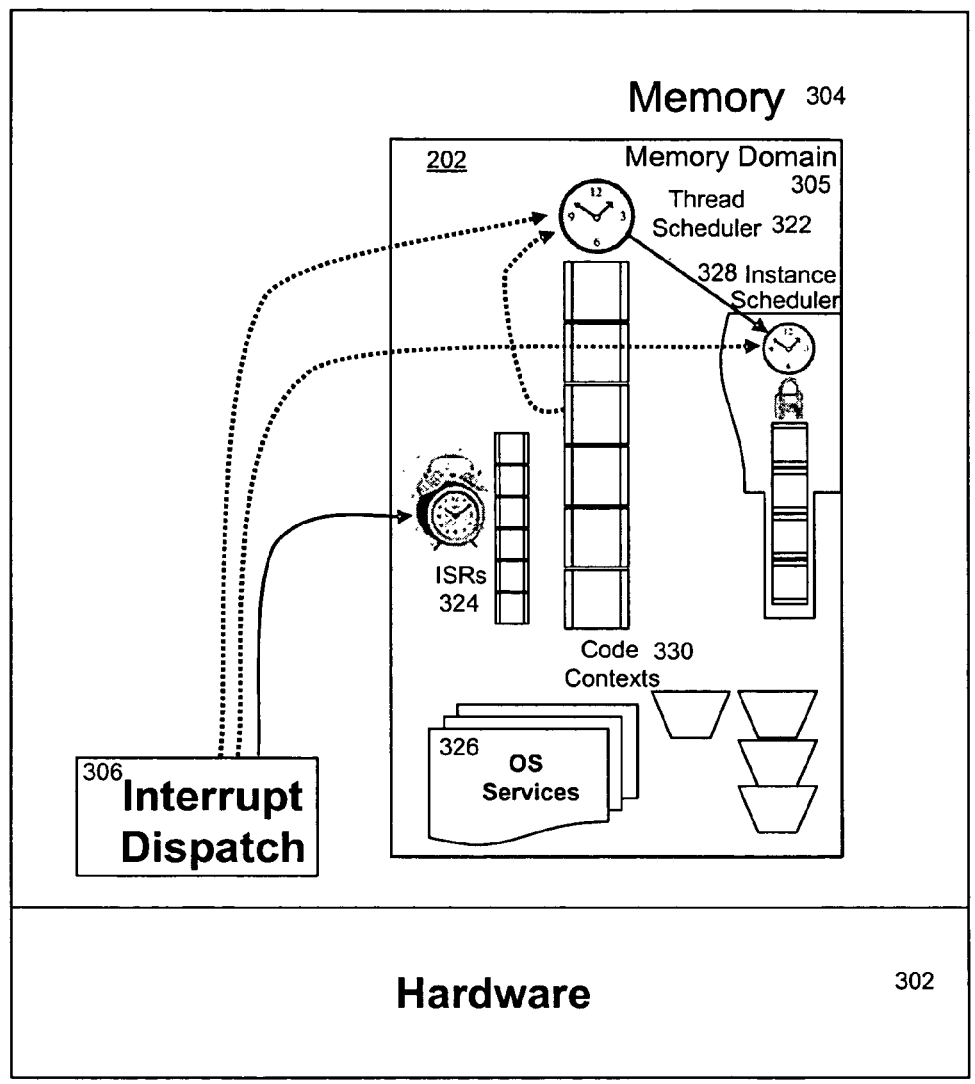
FIGS. 3A and 3B each illustrate a multiprocessor environment, consistent with features and principles of the present invention.
Figure 3B:
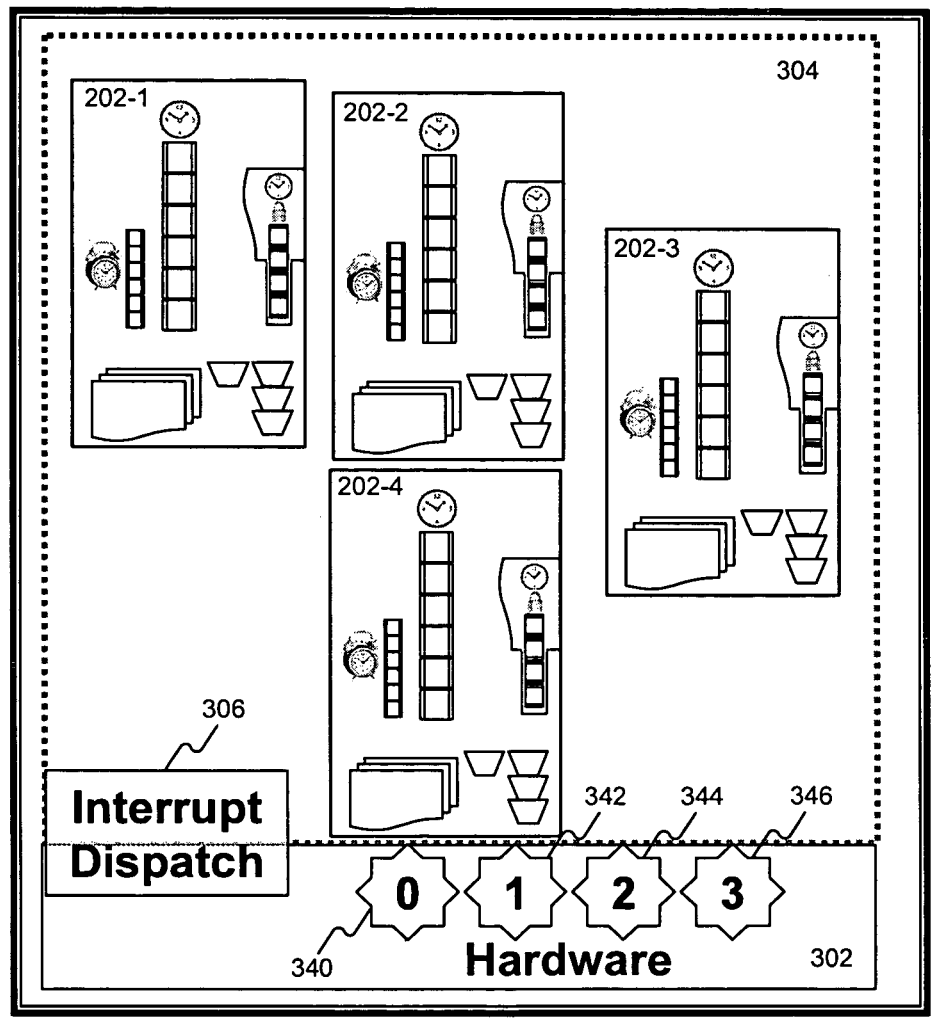

FIG. 3B illustrates another multiprocessor environment, where one or more instances may run on one or more CPUs, consistent with features and principles of the present invention. System 300 includes hardware 302 and memory 304. Hardware 302 includes a CPU complex and associated peripheral devices (not shown). Memory 304 can be partitioned in a variety of ways. Any particular contiguous set of addresses is referred to as a memory domain 305. One memory domain 305 may overlap and share some sets of addresses with another memory domain. A memory domain 305 may also completely enclose another memory domain 305 and may include memory-mapped hardware registers.

System 300 further includes interrupt dispatch code 306, which runs when hardware interrupts, exceptions, and other system events occur. Each instance 202 may contain thread scheduler 322, ISRs 324, OS services 326, and instance scheduler 328. Thread scheduler 322 in FIG. 3 manages a table of code contexts 330 and determines which one(s) will be active. Thread scheduler 322 may be invoked by a timer interrupt (preemption) and/or an active code context 330 (cooperative).

ISRs 324 in FIG. 3 are special code contexts that preempt thread contexts. ISRs 324 are invoked by the interrupt dispatch code 306. ISRs 324 also run on the CPU(s) that receive the interrupt. ISR policies insure that it is always possible to run an ISR 324 in the processor state of the instance 202 that registered it, on a CPU on which that the instance 202 is allowed to run.

OS services 326 are nondriver code routines that are common to the OS. The OS services 326 may control platform hardware as well as provide logical functions.

During configuration, an instance 202 is allowed to run on a single CPU, a subset of CPUs, or all CPUs. These permissions can be recorded in the instance table. If an instance 202 is allowed to run on any CPU, it is considered to be unbound. If an instance 202 that is bound to a single CPU installs an ISR 324, that interrupt is mapped (configured by software to be received) only to that single CPU. If an instance 202 that is bound to a subset of CPUs installs an ISR 324, that interrupt is mapped to that subset of CPUs. If an instance 202 that is unbound installs an ISR 324, that interrupt is mapped to all CPUs. Single instance 202 may register more than one ISR 324 for any interrupt. These chained ISRs 324 will run in the order in which they were registered. If more than one instance 202 installs an ISR 324 for the same interrupt (instance chaining), that interrupt is mapped to the union of all CPUs involved with that set of instances 202. ISRs 324 registered by more than one instance 202 are not guaranteed to run in any given order, although each ISR 324 chain within a specific instance 202 will run in the order registered.

An instance 202 may use all of platform memory 304, but it most often uses a smaller memory domain 305. Each instance 202 contains an instance scheduler 328 that is shared amongst all the instances 202. The instance scheduler 328 runs when the thread scheduler 322 goes into its idle loop. The instance scheduler 328 may also have additional triggers, such as a timer interrupt.

An instance 202 may load other instances into different memory domains 305. If there are more than one CPUs, then more than one instance 202 can run simultaneously—one instance 202 per CPU. Multiple instances 202 on different CPUs may not need to be swapped synchronously.

As shown in FIG. 3B, multiple instances can be configured to run on any single CPU. In FIG. 3B, system 304 includes platform memory 304 and hardware 302. Memory 304 includes four instances 202-1, . . . 202-4, and the hardware 302 contains four CPUs 340, 342, 344, and 346. Instance 202-1 may be dedicated to CPU 340 and CPU 342, instances 202-2 and 202-3 may be dedicated to CPU 344, and instance 202-4 may be dedicated to CPU 346. Each instance may execute on the single CPU dedicated to running that instance for a period of time. Alternatively, a single instance can be configured to run on more than one of the multiple CPUs in the system. Such an instance always runs on only one of the eligible CPUs during any specific period of time.

Figure 4:
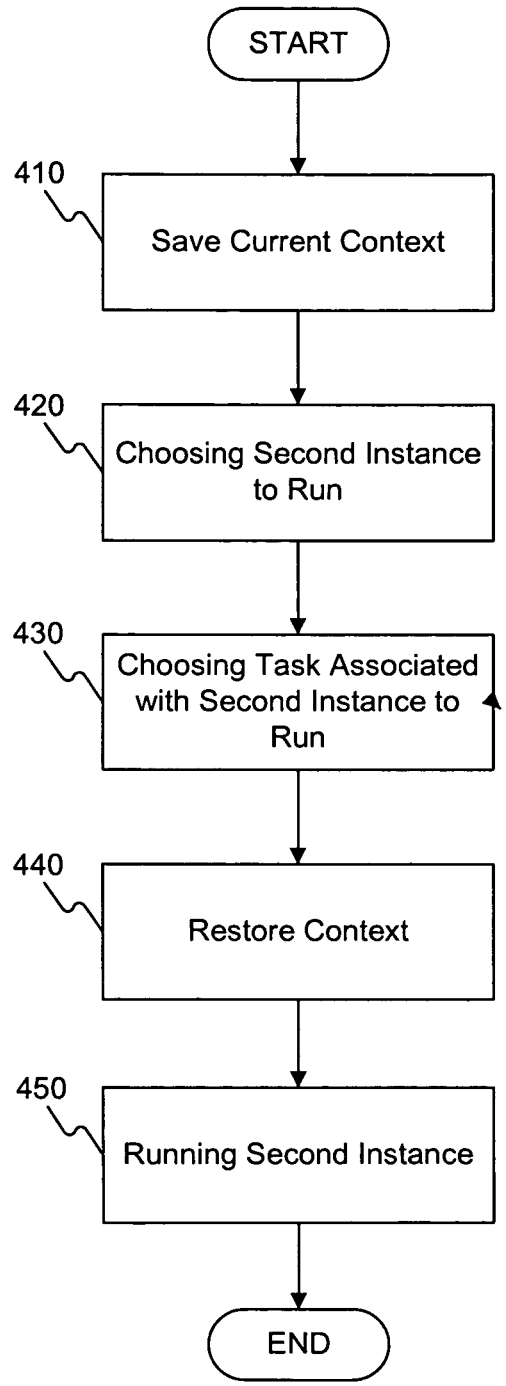
FIG. 4 illustrates a flow chart of a method for running a plurality of software instances, consistent with features and principles of the present invention.

FIG. 4 illustrates a flow chart of an exemplary method for running a plurality of software instances, consistent with features and principles of the present invention. In operation, any one of instances 202-1, . . . , 202-$n$ can be running on CPU complex 340-346. A hardware interrupt may then occur, which causes the CPU to save its state of execution via a context switch, and begin execution of an interrupt handler. Software interrupts are usually implemented as instructions in the instruction set, which cause a context switch to the interrupt handler similarly to a hardware interrupt.

Current context is saved in stage 410. This may occur, for example, in response to an interrupt. In a context switch, the processor state of the currently running thread must be saved, so that when the thread scheduler 322 (cf. FIG. 3A) gets back to the execution of the interrupted thread, it can restore this state and continue normally. The processor state of the thread includes all the registers that the thread may be using, especially, the program counter and the page table address register, plus any other OS specific data that may be necessary. Often, all the data that is necessary for saving the state is stored in one data structure called a context block.

Once the current context is saved, the instance manager 204 of the instance 202 that received the interrupt must determine which instance to run next (stage 420). The instance manager 204 may use any of the selection methods familiar to those skilled in the art, such as a round robin method, to determine the second instance to run.

The instance scheduler can be triggered both cooperatively and preemptively. Voluntarily yielding time to each instance is known as cooperative scheduling. An instance 202 may cooperatively release the CPU to another instance. Preemptive scheduling allows the computer system to more reliably guarantee each instance a regular "slice" of operating time. It also allows the system to rapidly deal with important external events like incoming data, which might require the immediate attention of one or another instance. Preemptive scheduling involves the use of an instance scheduler 328 (cf. FIG. 3A), which hands out CPU time to various instances so that they can share the CPU resources fairly. Therefore, all instances will get some amount of CPU time during any given time interval.

Instance scheduler 328 (cf. FIG. 3A) may determine which instance to run next (stage 420). Page tables may be used to swap from one instance to another. A page table is the data structure used by a virtual memory system in a computer OS to store the mapping between virtual addresses and physical addresses. The page table holds the mapping between a virtual address of a page and the address of a physical frame.

Thread scheduler 322 (cf. FIG. 3A) may then execute to determine which thread internally to run (stage 430). The thread scheduler 322 may be invoked either by a periodic timer interrupt that causes the thread scheduler 322 to run or by a software trap executed by a running program that causes the thread scheduler 322 to run. In either case, the thread scheduler 322 may examine the state of the currently running instance and, if the thread may be swapped out, swaps the thread out and runs another thread. There are a variety of known techniques for thread swapping in a multitasking OS. In an embodiment of the present invention, a round robin swapping technique is used. Finally, a context restore occurs restoring context to the second instance (stage 440). Instance manager 204 may then restore context of the second instance. The second instance may then be run on the system (stage 450).

Figure 5:
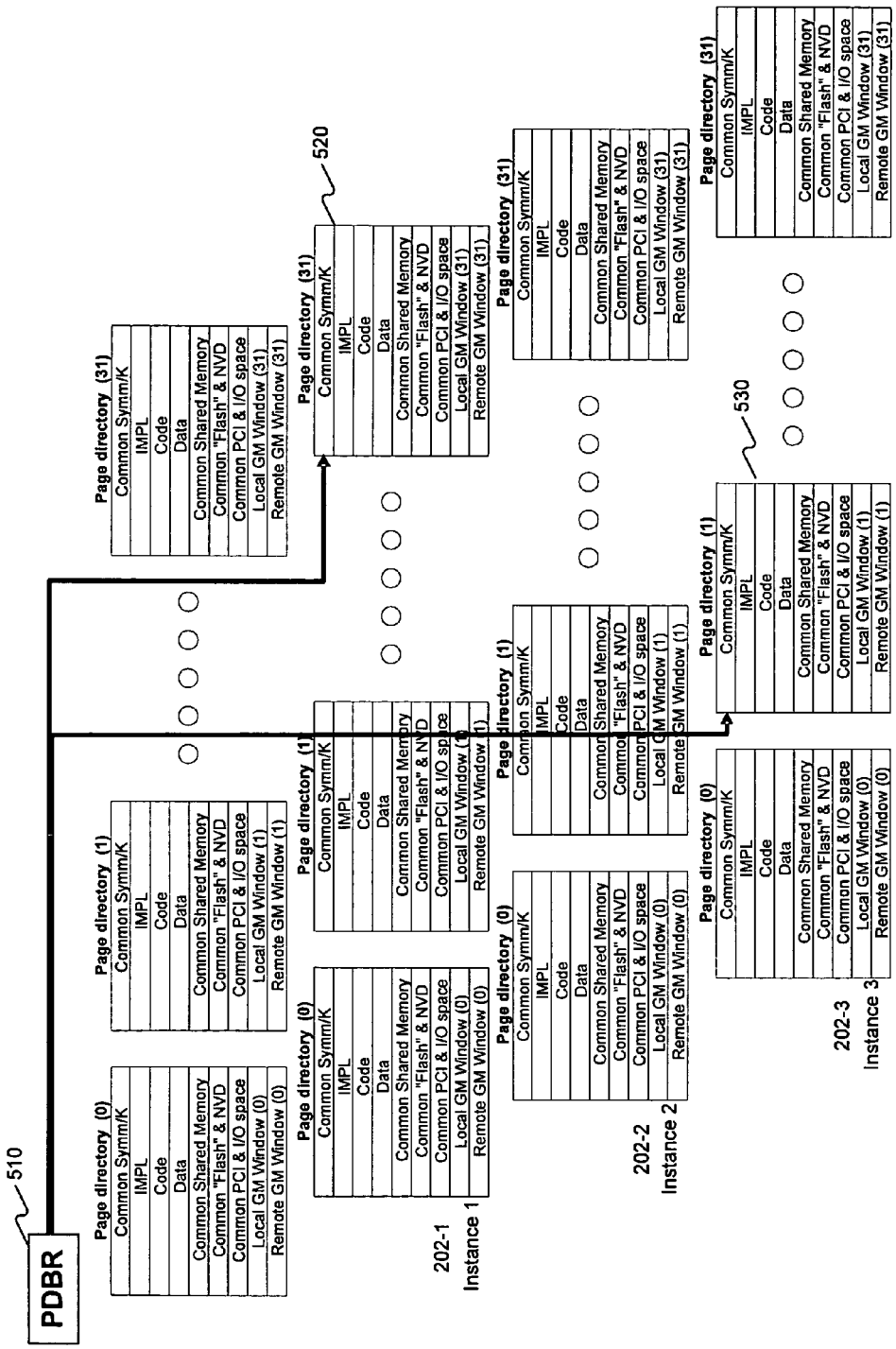
FIG. 5 illustrates an example of an instance swap, consistent with features and principles of the present invention.

FIG. 5 illustrates an example of an instance swap, consistent with features and principles of the present invention. FIG. 5 illustrates an instance swap from instance 1, 202-1 to instance 3, 202-3. As shown in FIG. 5, the page table address register (PDBR) 510 points to the page tables of whatever instance is to run. In this example, instance 1, 202-1 using page table 520 was swapped out for instance 3, 202-3 using page table 530.

It may be appreciated by one of ordinary skill in the art that other instance swapping techniques, such as techniques that provide different priority levels to some of the instances, and/or techniques that determine which instances have been swapped in least recently, may also be used.

Figure 6:
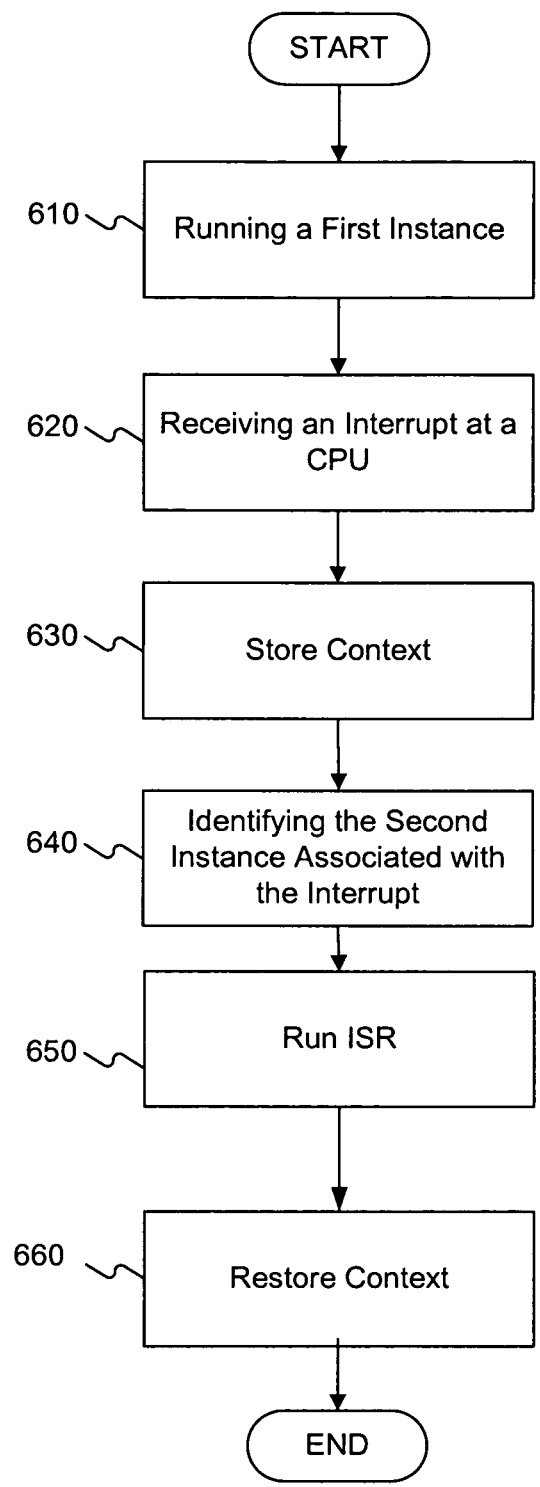
FIG. 6 illustrates a flow chart of a method of mapping an interrupt to one or more software instances, consistent with features and principles of the present invention.

FIG. 6 illustrates a flow chart of an exemplary method for mapping an interrupt to one or more instances, consistent with features and principles of the present invention. As discussed above, in stage 610, a first instance is run on a CPU. After an interrupt is received at the CPU in stage 620, the context of the first instance is saved in stage 630. This context save is done as part of the interrupt dispatch code. When the context of an instance is saved, the state of the instance, the state of all of the registers that the instance may be using, and any operating specific data that may be necessary to the instance is saved. This includes, for example, the state of the program counter and the page table address register. This data can be stored, for example, in a data structure known as a context block. Accordingly, when the instance scheduler 328 (cf. FIG. 3A) returns to the instance, it can restore the context and continue the instance from the point at which it was interrupted.

In stage 640, the instance that is associated with the received interrupt is identified. Specifically, the interrupt dispatch code determines which instance 202 registered the ISR 324. The associated instance must be among the set of instances that has registered an interrupt handler for the received interrupt, that can be run on the current CPU, and that is not actively running on another CPU. If more than one instance satisfies the foregoing criteria, selection of the instance is random. For example, by selecting instances based on an instance number assigned when each instance is first executed. In this case, there is no specified execution ordering between several instances that have registered handlers for the same interrupt, including whether or not the currently running instance is selected before or after other eligible instances.

As discussed above, each instance registers its ISRs with the instance manager using an existing system call to fill in a table for the interrupt dispatch code. Once the ISR's for each instance are registered, the interrupt is delivered to the union of all CPUs on which an ISR associated with the interrupt could be running. The interrupt dispatch code identifies an associated instance that is able to be run on the current CPU and begins to execute its ISR(s) by performing an ISR context swap. The swap is accomplished, for example, by changing the processor state, to use the identified instance's ISR code context (stage 650). This is possible because the context of the currently running instance has already been saved as part of running the interrupt dispatch code and any instance that is not currently running has its context saved as part of an instance swap.

After the ISR or ISRs are complete, the interrupt dispatch code restores the context of the previous instance (stage 660). Therefore the instance 202 that was running before the interrupt can proceed from the point at which it was interrupted. When an instance registers an ISR, that ISR will always run in the processor state of that instance regardless of what instance may be running when the associated interrupt occurs. This ensures that the ISR will always use the hardware resources and page tables of the instance in which it was registered.

In one embodiment, if the current running instance has an ISR for the interrupt that has occurred, the update of the page table address register may be avoided as unnecessary. In such an embodiment, the interrupt dispatch code checks if the current instance meets the criteria before changing the page table address register.

The embodiments and aspects of the invention set forth above are only exemplary and explanatory. They are not restrictive of the invention as claimed. Other embodiments consistent with features and principles are included in the scope of the present invention. As the following sample claims reflect, inventive aspects may lie in fewer than all features of a single foregoing disclosed embodiment. Thus, the following claims are hereby incorporated into this description, with each claim standing on its own as a separate embodiment of the invention.

What is claimed is:

1. A method of mapping an interrupt to one or more of a plurality of instances, comprising:
   registering a plurality of instances to run on a current CPU;
   running a first instance of the plurality of instances on the current CPU;
   for each of at least two instances of the plurality of instances, being different from the first instance, registering an interrupt service routine thereof that is able to handle an interrupt, wherein each of the at least two instances has a corresponding code context, and wherein, for each of the at least two instances, the interrupt service routine registered therewith, if executed, runs using the corresponding code context of the instance with which the interrupt service routine is registered;
   receiving the interrupt at the current CPU;
   in response to receiving the interrupt, storing context information relating to the first instance;
   identifying one of the at least two instances as a second instance of the plurality of instances, the second instance having the interrupt service routine that is registered to handle the interrupt, wherein the second instance is identified by selecting the second instance from among all instances of the plurality of instances that: (i) have the interrupt service routine that is registered to handle the interrupt, (ii) are registered to run on the current CPU and (iii) are not actively running on another CPU;
   running the interrupt service routine of the second instance using the corresponding code context of the second instance and using the current CPU; after completing the interrupt service routine, restoring the context information relating to the first instance;
   registering each of the plurality of instances to run on one of a plurality of CPUs, a subset of the plurality of CPUs, or all of the plurality of CPUs; and
   delivering the interrupt to a union of all CPUs that any of the plurality of instances comprising the interrupt service routine for that interrupt are registered to run on.

2. The method of claim 1, wherein more than one instance is identified as satisfying the conditions (i), (ii) and (iii), and wherein identifying the second instance includes selecting one of the identified instances at random.

3. The method of claim 1, wherein running the interrupt service routine further comprises:
   performing a context swap by changing the processor state to use the context information, including a page table address register, of the second instance.

4. The method of claim 1, further comprising, after storing context information relating to the first instance, checking if the first instance has registered the interrupt service routine for the interrupt.

5. The method of claim 1 wherein the interrupt service routine is a code context that preempts thread contexts.

6. A system for running a plurality of software instances on an embedded computer system without requiring substantial changes to each software instance, the system comprising:
   a central processing unit (CPU); and
   a memory, wherein the CPU and the memory are configured to perform a method comprising:
      registering a plurality of instances to run on the CPU;
      running a first instance of the plurality of instances on the CPU;
      for each of at least two instances of the plurality of instances, being different from the first instance, registering an interrupt service routine thereof that is able to handle an interrupt, wherein each of the at least two instances has a corresponding code context, and wherein, for each of the at least two instances, the interrupt service routine registered therewith, if executed, runs using the corresponding code context of the instance with which the interrupt service routine is registered;
      receiving the interrupt at the CPU;
      in response to receiving the interrupt, storing context information relating to the first instance;
      identifying one of the at least two instances as a second instance of the plurality of instances, the second instance having the interrupt service routine that is registered to handle the interrupt, wherein the second instance is identified by selecting the second instance from among all instances of the plurality of instances that: (i) have the interrupt service routine that is registered to handle the interrupt, (ii) are registered to run on the CPU and (iii) are not actively running on another CPU;
      running the interrupt service routine of the second instance using the corresponding code context of the second instance and using the CPU;
      after completing the interrupt service routine, restoring the context information relating to the first instance;
      configuring each instance to run on a single CPU, all CPUs or a subset of all the CPUs; and
      delivering the interrupt to a union of all CPUs that any interrupt service routine for that interrupt could be running on.

7. The system of claim 6, wherein more than one instance is identified as satisfying the conditions (i), (ii) and (iii), and wherein identifying the second instance includes selecting one of the one or more instances in a random order.

8. The system of claim 6, wherein running the interrupt service routine further comprises:
   performing a context swap by changing the processor state to use the context information, including the page table address register, of the second instance's context.

9. The system of claim 8, further comprising:
   determining whether the first instance has the interrupt service routine for the interrupt;
   performing the context swap based on the determining step.

10. The system of claim 6, wherein the interrupt service routine is a code context that preempts thread contexts.

* * * * *